United States Patent [19]

Atkinson

[11] Patent Number: 4,502,049
[45] Date of Patent: Feb. 26, 1985

[54] UNIVERSAL SIGNALLING TONE RECEIVER

[75] Inventor: Roger F. Atkinson, Huntsville, Ala.

[73] Assignee: Itec, Inc., Huntsville, Ala.

[21] Appl. No.: 413,142

[22] Filed: Aug. 30, 1982

[51] Int. Cl.³ .............................................. H04Q 9/14
[52] U.S. Cl. .......................... 340/825.73; 179/84 VF; 328/139; 328/151
[58] Field of Search ....................... 340/825.73, 825.74, 340/825.71; 179/84 VF; 370/110.3; 328/139, 140

[56] References Cited

U.S. PATENT DOCUMENTS

4,354,248 10/1982 Conger ........................... 179/84 VF
4,369,338 1/1983 Soulliard ......................... 179/84 VF
4,370,650 1/1983 Norrell ............................ 340/825.71

Primary Examiner—Donald J. Yusko
Attorney, Agent, or Firm—Cushman, Darby & Cushman

[57] ABSTRACT

An inexpensive universal telephone signalling tone receiver employs switched capacitor filters to provide selective tone reception in accordance with pre-selected clock signal frequencies. The clock signals, which in the preferred embodiment are provided from an EPROM, are employed to determine the pass band center frequency for respective filters. The selected signalling tones, when received, are rectified and passed to respective sample and hold circuits, the output signals of which are sequentially applied for processing to a common analog-to-digital converter through a multiplexer. Depending upon the clock pulse frequencies programmed for a particular application, the receiver can be used for various signalling protocols, including R1 and R2, in either direction, as well as other single or multi-tone signalling applications. In multifrequency signalling applications, the receiver selectivity permits the processing circuitry to look for two tones of significant amplitude among noise components rather than to continuously adjust threshold detectors, in response to the wide band signal level.

12 Claims, 3 Drawing Figures

UNIVERSAL SIGNALLING TONE RECEIVER

BACKGROUND OF THE INVENTION

1. Technical Field

The present invention relates to selective receiver circuits and, more particularly, to a method and apparatus for selectively receiving telephone signalling tones which are present in a wide band audio signal.

2. The Prior Art

Signalling between telephone systems central offices is usually effected by multi-frequency (MF) coding. Different signalling protocols are employed in different parts of the world. For example, the inter-office MF signalling protocol used by American Telephone and Telegraph Company in the United States is referred to as R1. The R1 signalling protocol is considered to be an open loop signalling system because there is no acknowledgment of signal reception returned to the sending office. Tone pairs are transmitted at the rate of approximately seven pairs per second and reception and processing at the receiving office is assumed. There are six different tones employed in the R1 protocol, beginning at 700 Hz and ending at 1700 Hz, the tones being successively spaced by 200 Hz.

The signalling protocol employed most frequently outside the United States and Canada is the R2 protocol established by CCITT. This protocol is considered to be closed loop since reception acknowledgment codes must be received before the transmitting office sends further information. Tone pairs are sent continuously until an acknowledgment, in the form of another tone pair, is received at the transmitting office. Transmission in one direction includes pairs from a first group of six tones, successively spaced by 120 Hz, beginning at 540 Hz and ending at 1140 Hz. Transmission in the opposite direction includes pairs from a second group of six tones, also successively spaced by 120 Hz, beginning at 1380 Hz and ending at 1980 Hz.

In addition to the R1 and R2 signalling protocols, which are used to set up a call between central offices, there are other signalling arrangements, such as SF (single frequency). For example, a 2600 Hz tone is commonly employed for various supervisory signalling functions in telephony.

Multiple signalling receivers are required at each central office to separate the signalling tone from the wide band audio signals on each trunk. The R2 signalling protocol has presented particularly difficult problems for hardware designers. Since there are two groups of signalling frequencies, receivers used for receiving forwardly-transmitted signalling tones cannot be used for receiving backwardly-transmitted signalling tones. Moreover, since the individual tones are separated by only 120 Hz, discrimination is difficult, particularly among adjacent tones in the higher frequency group. When high-Q filters are employed to enhance discrimination, the response time of the filter is increased so that a tradeoff has to be made and performance is compromised.

The most advanced prior art receivers employed for the R2 signalling protocol employ analog active filters to separate tones. A threshold detector is employed at the output of each filter to determine if a signalling tone has been received. The threshold detector must have an adjustable threshold because the amplitude of the wide band audio signal in which the tones reside varies in accordance with transmission distances between central offices. In order to avoid having to adjust the threshold level, some receivers include many cascaded stages of filtering to provide sharp skirts on the filter frequency response, thereby avoiding cross-talk in the passband overlap regions. However, as noted above, this increases the filter response time, in some instances, to an intolerable degree.

In any case, the prior art filters employed for the R2 signalling protocol are extensive, require certain compromises in performance, and are useful for transmission in only one direction. Moreover, such filters are not universal since they cannot be used for other signalling protocols, such as the R1 signalling protocol, because they are permanently tuned to receive one or the other of the R2 frequency groups.

OBJECTS AND SUMMARY OF THE INVENTION

It is, therefore, an object of the present invention to provide a signalling tone receiver which is universal in a sense that it can be operable under the R1 and R2 signalling protocols as well as other tone signalling protocols.

It is another object of the present invention to provide a universal signalling tone receiver which is relatively inexpensive, does not require threshold level adjustments in response to the wideband signal containing the signal tone components, and has a fast response time.

Still another object of the present invention is to provide a universal signal tone receiver capable of receiving signals transmitted in either direction in the R2 telephone signalling protocol.

It is a further object of the present invention to provide a universal telephone signal tone receiver of the type described which meets all of the specifications for operation in the R1 and R2 signalling protocols and which eliminates the need for cascaded active filter stages and variable threshold detection circuits.

In accordance with the present invention, tone filtering is effected with switched capacitor filters or similar switched component filters having passband center frequencies which are determined by an applied clock signal frequency and having Q values which are adjusted by changing a component value. Thus, by simply changing the clock frequency applied to any filter, the tones selected and passed by that filter can be changed. In the preferred embodiment, the clock signals are derived from an erasable programmable memory (EPROM) having its address terminals driven by a counter which counts a master clock signal. The frequency of the output clock signals from the EPROM can be changed by simply reprogramming the EPROM.

The output signal from each switched capacitor filter is rectified and passed to a respective resettable sample and hold circuit. The stored sample and hold circuit signals are selectively passed individually to an analog-to-digital converter, the output signal from which is processed accordingly.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings, wherein.

DESCRIPTION OF THE PREFERRED EMBODIMENTS

The preferred embodiment of the universal tone receiver described and illustrated herein was specifically designed for use in a system designated Universal E & M Trunk, Product No. 600884, manufactured by ITEC, Inc. of Huntsville, Ala., assignee of the present patent application. The Universal E & M Trunk is a microprocessor-controlled trunk capable of both R1 and R2 signalling capabilities. Each trunk has a Z80 microprocessor which controls signalling, call charge metering, digit adding, deleting or translation and other control functions. In the preferred embodiment of the universal tone receiver of the present invention, the Z80 microprocessor of the Universal E & M Trunk controls certain receiver timing sequences; however, it should be noted that other means for timing control can be employed within the scope of the present invention. In other words, the Universal E & M Trunk does not constitute part of the present invention and is not specifically described herein. The universal tone receiver alone constitutes the invention, irrespective of how and with what it is controlled and of the particular system in which it may be placed.

Figure 1:
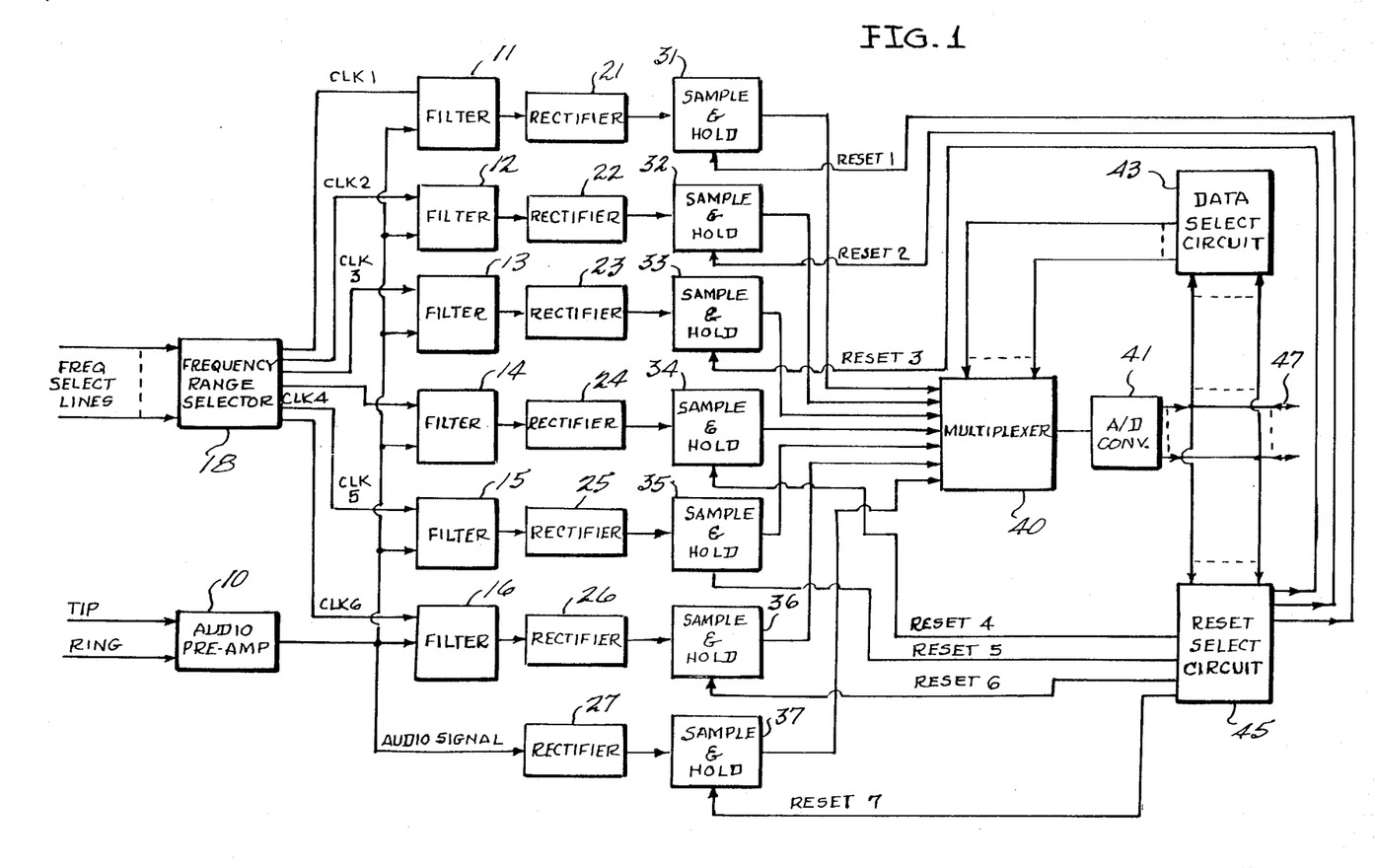
FIG. 1 is a functional block diagram of a preferred embodiment of the signal tone receiver of the present invention.

Referring now to the block diagram of the receiver illustrated in FIG. 1, a wideband audio signal of the type transmitted between central telephone offices is received on the two-wire (i.e. Tip and Ring) line by audio pre-amplifier 10. The amplified audio signal is applied to each of plural filters 11, 12, 13, 14, 15 and 16. These filters are preferably switched capacitor (or other switched component) filters of the type having a passband centered about a frequency which is determined by the frequency of an applied clock signal. A different clock signal, namely CLK1, CLK2 ... CLK6, is applied to each filter 11, 12 ... 16, respectively, from a frequency range selector unit 18. The frequency range selector unit may be any source of plural clock signals with the capability of changing the frequency of any or all of the clock signals.

The narrow band signals passed by filters 11-16 are applied to respective rectifier circuits 21-26. In addition, the wide band audio signal provided by pre-amplifier 10 is applied to a similar rectifier circuit 27. Preferably, rectifier circuits 21-27 are full wave rectifiers. Each rectifier circuit 21-27 supplies its rectified output signal to a respective sample and hold circuit 31-37. The sample and hold circuits detect the peak of the applied rectified signals and store the peak levels until the circuits are individually reset by the signals Reset 1 through Reset 7, respectively.

The stored levels at the sample and hold circuits 31-37 are individually selected and passed to an analog-to-digital converter 41 by multiplexer 40. The particular sample and hold circuit selected at any instant of time is determined by the address signal applied to multiplexer 40 from a data select circuit 43. The latter is externally controlled by a multibit binary signal appearing on a data bus 47 which is a bidirectional bus used to transmit data in either of two directions. In the ITEC 600884 system noted above, the binary signal applied to the data select circuit to control multiplexer operation is derived from the system Z80 microprocessor. It should be noted, however, that any external control arrangement may be employed to provide multiplexer control data.

The Reset 1 through Reset 7 signals are determined from a reset select circuit 45 which essentially consists of a plurality of latch circuits arranged in parallel to receive parallel binary address bits which identify which of the sample and hold circuits is to be reset. These binary address bits are also derived under external control, for example, from a Z80 microprocessor, on bi-directional data bus 47.

The binary output data from the analog-to-digital converter 41 is passed to data bus 47 for delivery to the external processing circuit which, as noted above, may be a microprocessor. The levels of the signals at each sample and hold circuit 31-37 can, thus, be individually and sequentially converted to binary digital form and analyzed by a microprocessor, or the like, to determine if a signal tone or combination thereof has been received.

Figure 2:
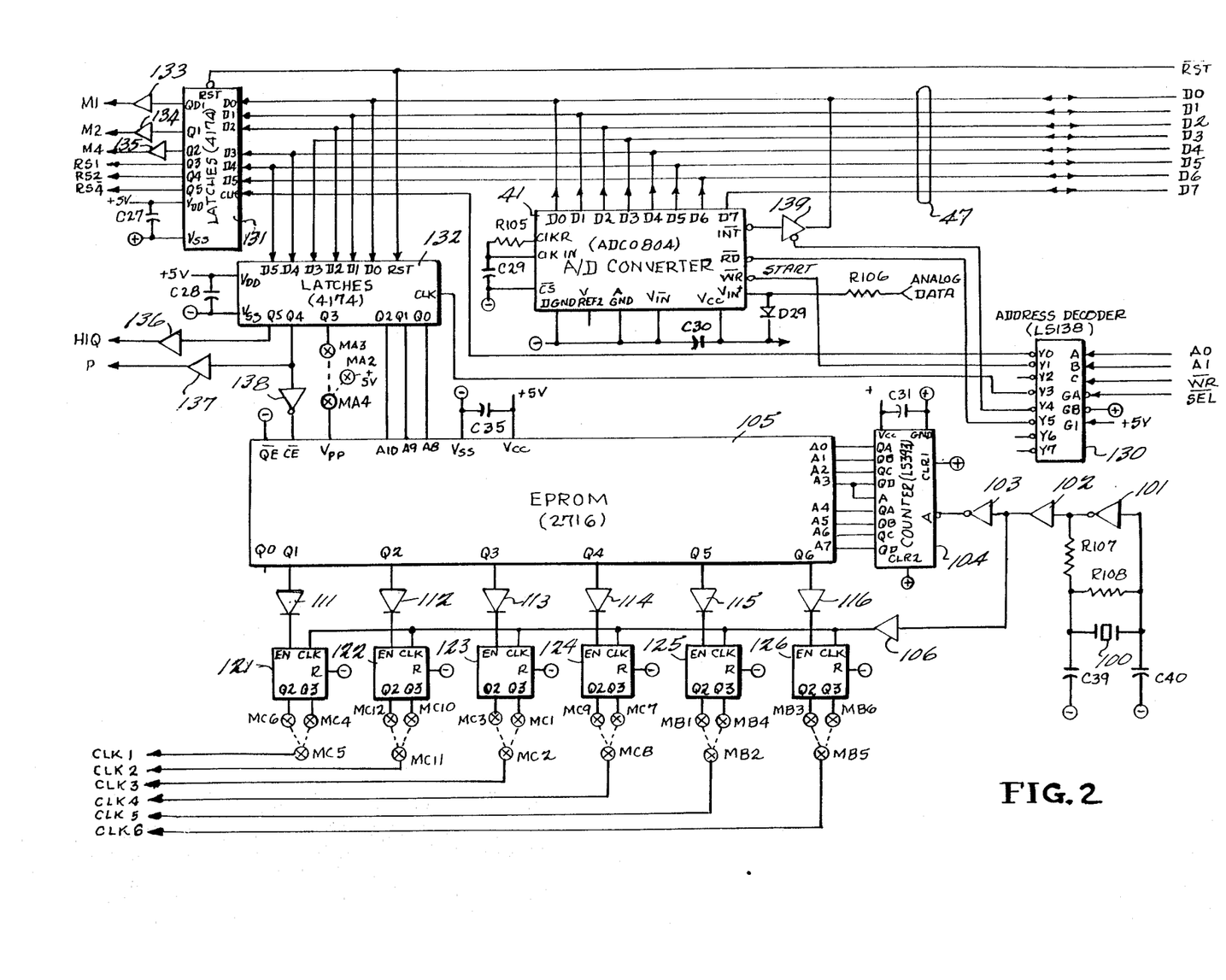
FIG. 2 is a schematic diagram of a portion of the receiver of FIG. 1.
Figure 3:
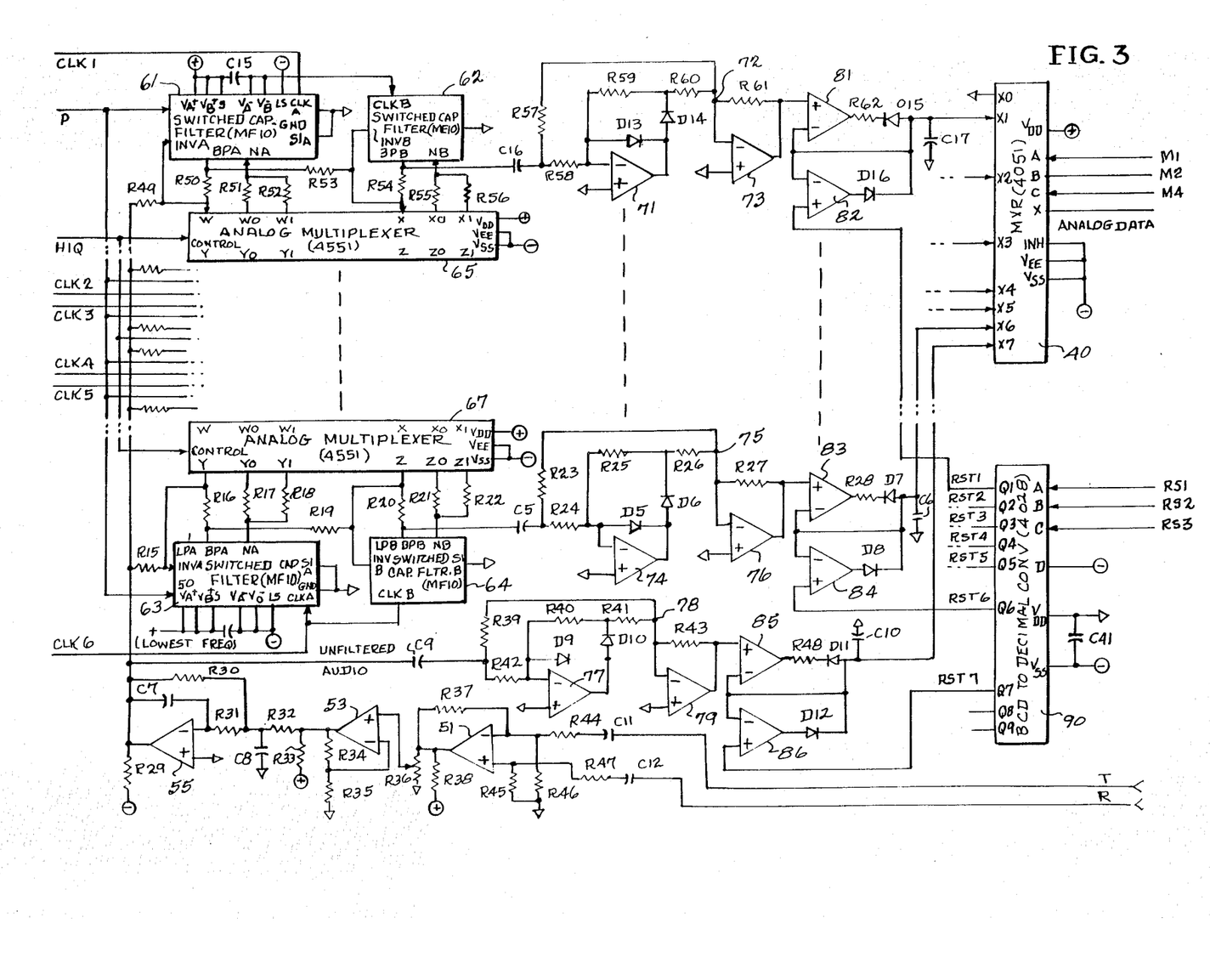
FIG. 3 is a schematic diagram of the remaining portion of the receiver of FIG. 1, whereby FIGS. 2 and 3 together constitute a complete schematic diagram of the entire receiver of FIG. 1.

The system of FIG. 1 is illustrated in greater detail in the schematic diagram of FIGS. 2 and 3 to which specific reference is now made. The received wideband audio signal is applied from between the T (Tip) and R (Ring) lines, illustrated in the lower right-hand corner of FIG. 3, to the audio pre-amplifier which includes operational amplifiers 51, 53 and 55 and their associated RC components including capacitors C7, C8, C11, C12 and resistors R29 through R38, inclusive, and R44 through R47, inclusive. The pre-amplifier is substantially conventional and is employed to provide the wideband audio signal at a workable amplitude level for the filters, rectifiers and sample and hold circuits. The amplified signal, which is designated as the UNFILTERED AUDIO signal in FIG. 3, is applied to each of six switched capacitor filters, corresponding to filters 11-16 of FIG. 1, only two of which, namely filter 61-62 and filter 63-64, are illustrated in FIG. 3. In this regard, it should be noted that there are six identical tone selecting channels in the preferred embodiment of the invention, but that only the highest frequency channel (including filter 61-62) and the lowest frequency channel (including filter 63-64) are illustrated to avoid repetition and to simplify understanding of the invention. Each switched capacitor filter is preferably a Model MF10 Universal Monolithic Dual Switched Capacitor Filter, manufactured and sold by the National Semiconductor Corporation of Santa Clara, Calif. The MF10 consists of two independent CMOS active filters capable of producing various second order filter functions having frequency pass or null bands determined by the frequency of an applied clock signal. In the configuration employed in the present invention, each filter 61-62, 63-64 is operated as a band pass filter having its passband centered about a frequency which is one-fiftieth of the applied clock signals CLK1-CLK6, respectively. Each channel employs both filter sections of an MF10 filter unit in cascade to provide two stages of filtering, or a four pole filter, in each channel. Thus, the output signal from filter stage 61 is applied as an input signal to an identical bandpass filter stage 62 whereas the output signal from filter stage 63 is applied to an identical filter stage 64. The UNFILTERED AUDIO signal is applied to filters 61 and 63 through resistors R49 and R15, respectively; the partially filtered input signals to second filter stages 62 and 64 are applied through resistors R53 and R19, respectively.

The quality factor (Q) of each MF10 filter stage is adjustable as a function of the resistance between its BP and N terminals. Therefore, by selectively switching resistors connected between these terminals, it is possible to adjust the Q of each filter. To this end, an analog multiplexer 65 is employed to switch resistors associated with each of the filter stages 61 and 62; a similar analog multiplexer 67 is provided to serve this function for filter stages 63 and 64. These analog multiplexers may be of the type sold under the general product identification No. 4551, such as the Quad 2-Input Analog Multiplexer/Demultiplexer unit No. MC14551B, sold by Motorola Semiconductor Products, Inc. of Austin, Tex. These units are, in essence, digitally-controlled analog switches. One such switch selectively connects its W terminal to either its W0 or W1 terminal so that resistor R50 is selectively connected in series with resistor R51 or resistor R52 between the BPA and NA terminals of filter stage 61, depending upon the binary level of the HI Q signal applied to the multiplexer control input terminal. This same HI Q signal controls the alternative connection of terminal X of multiplexer 65 to terminals X0 and X1 so that resistor R54 is selectively connected in series with resistor R55 or resistor R56 between terminals BPB and NB of filter stage 62. The other two switch sets of multiplexer 65 are employed for the second channel (not illustrated for purposes for simplifying understanding) so that each multiplexer 65, 67, etc., is shared by two tone filtering channels. This is illustrated in multiplexer 67 of the sixth channel wherein the Y terminal is selectively connected to the Y0 or Y1 terminals and the Z terminal is selectively connected to the Z0 or Z1 terminals under control of the HI Q signal. In this manner, resistor R16 is selectively connected in series with resistors R17 or R18 between the BPA and NA terminals of filter stage 63, and resistor R20 is selectively connected in series with resistors R21 or R22 between the BPB and NB terminals of filter stage 64. By selectively changing the total resistance between the BPA and NA terminals, and between the BPB and NB terminals, of the filter stages, multiplexer 65 permits the Q of the stages to be switched between two values under the control of the HI Q signal.

It should be noted that each filter stage 61, 62, 63, 64, etc. is a switched capacitor band pass filter wherein the center frequency of the passband is a sub-multiple (e.g. 1/50) of the frequency of the applied clock signal (e.g. CLK1 through CLK6) and wherein the Q is adjustable by changing resistance values. Other switched component filters may be employed to achieve the same result and at least one programmable filter is commercially available in which Q is programmably adjustable.

The filter output signal in each tone channel is passed through a series capacitor, such as capacitor C16 in the first channel and capacitor C5 in the sixth channel, to a full wave rectifier circuit, corresponding to rectifier circuits 21-27 of FIG. 1. The rectifier circuit for the first channel includes a pair of operational amplifiers 71, 73, each having an inverting input terminal (−), a non-inverting input terminal (+), and an output terminal. The input signal passed by capacitor C16 is passed through a resistor R58 to the inverting input terminal of amplifier 71. A diode D13 has its anode connected to this inverting input terminal and its cathode connected to the output terminal of amplifier 71. A further diode D14 is connected in series with resistor R59 between the output and inverting input terminals of amplifier 71 with the anode of diode D14 being connected to the amplifier output terminal. The cathode of diode D14 is also connected, to one side of a resistor R60, the other side of which is connected at junction 72, to one side of a resistor R57, to one side of a resistor R61, and to the inverting input terminal of amplifier 73. The other side of resistor R57 is connected to the junction between capacitor C16 and resistor R58 whereas the other side of resistor R61 is connected to the output terminal of amplifier 73. The non-inverting input terminals of amplifiers 71 and 73 are connected to analog ground which, in the disclosed embodiment, rides at a positive voltage on the order of five volts.

The full wave rectifier circuit provides a positive full wave rectified signal at junction 72, which signal is inverted by amplifier 73 to provide a negative full wave rectified signal. More specifically, when the signal applied through capacitor C16 is negative, amplifier 71 provides a positive signal level which is passed through diode D14 and resistor R60 to junction 72. When the input signal received from capacitor C16 is positive, this positive level is fed through resistor R57 to junction 72, and amplifier 71 has its output terminal clamped to a negative level by the voltage drop across diode D13. Diode D14 effectively subtracts out this diode drop at the junction of resistors R59 and R60 so that the junction is at analog ground (approximately +5 volts) and thereby provides a positive reference for the signal at junction 72.

A similar rectifier circuit is provided for each channel with only the components for the sixth channel being illustrated. Specifically, the components in the sixth channel rectifier circuit which correspond to those described above for the first rectifier circuit are as follows, with the corresponding first channel components being noted in parenthesis: amplifiers 74 (71) and 76 (73); junction 75 (72); resistors R23 (R57), R24 (R58), R25 (R59), R26 (R60) and R27 (R61); and diodes D5 (D13) and D6 (D14). A similar rectifier circuit is also provided for the UNFILTERED AUDIO signal and includes corresponding components as follows: amplifiers 77 (71) and 79 (73); junction 78 (72); resistors R39 (R57), R40 (R59), R41 (R60), R42 (R58), and R43 (R61); and diodes D9 (D13) and D10 (D14).

Rather than integrating the rectified output signal in each channel, such as by placing a capacitor across resistor R61 the present invention employs a fast-acting sample and hold circuit in each channel corresponding to sample and hold circuits 31-37 of FIG. 1. An integrator circuit would add response time to each channel and would thereby severely limit the speed in which the system could process received tones. The sample and hold circuit, on the other hand, substantially eliminates this delay. The first channel sample and hold circuit includes operational amplifiers 81 and 82, each having inverting and non-inverting input terminals and an output terminal, a low resistance resistor R62 connected between the output terminal of amplifier 81 and the cathode of a diode D15, a further diode D16 connected anode-to-cathode between the output terminal of amplifier 82 and the anode of another diode D15, and a capacitor C17 between analog ground and the junction between diodes D15 and D16. The non-inverting input terminal of amplifier 81 receives the output signal from amplifier 73 of the rectifier circuits. The non-inverting input terminal of amplifier 82 receives the sample and hold reset signal for the first channel which is designated RST1. The inverting input terminals of both amplifiers 81 and 82 are connected together and to the junction between diodes D15 and D16 and capacitor C17.

The rectified signal applied to the non-inverting input terminal of amplifier 81 is a negatively pulsating d.c. signal. It produces a negatively pulsating output signal from that amplifier which charges capacitor C17 relative to the analog ground level (+5 volts) through low-resistance resistor R62 and diode D15. There is no discharge path for capacitor C17 and, therefore, it remains charged to the negative peak of the rectified signal passed by amplifier 81 until the circuit is reset by the RST1 signal. The RST1 signal is normally at a negative level and rises to analog ground when pulsed to effect reset of the sample and hold circuit. The positive reset pulse provides a positive level at the output of amplifier 82 which discharges the negatively charged capacitor C17 through diode D16. This low-resistance discharge path effects substantially instantaneous discharge of the capacitor which quickly charges in the next cycle of the tone filtered in the first channel to the negative peak of the full wave rectifier filtered tone. Fast charging (i.e. in one cycle) is effected due to the low resistance (e.g. 100 Ohms) of resistor R62.

Each channel, including the UNFILTERED AUDIO channel has a similar sample and hold circuit which receives a full wave rectified signal, stores it, and is selectively reset (by reset signals RST1 through RST7, respectively) in the same manner. The only sample and hold circuits illustrated, other than the one in the first channel, is the sixth channel circuit and a seventh channel circuit, the latter being the channel employed for the UNFILTERED AUDIO signal. The components of the sixth channel sample and hold circuits which correspond to the first channel components are as follows: amplifiers 83 (81) and 84 (82); resistor R28 (R62); diodes D7 (D15) and D8 (D16); and capacitor C6 (C17). The corresponding components in the UNFILTERED AUDIO channel sample and hold circuit are as follows: amplifiers 85 (81) and 86 (82); resistor R48 (R62); diodes D11 (D15) and D12 (D16); and capacitor C10 (C17).

The voltage level stored in each sample and hold circuit capacitor in each of the first through seventh channels is applied to a respective input terminal X1 through X7 of an analog multiplexer 40 corresponding to the similarly designated multiplexer of FIG. 1. By way of example, multiplexer 40 may be the type sold by the aforementioned Motorola Semiconductor Products, Inc. as part No. MC14051B. This multiplexer is a digitally-controlled analog switch which selectively passes individual analog signals applied at input terminals X1 through X7 in accordance with the binary number applied to selector terminals A, B and C. The passed analog signal appears at output terminal X. The binary selector signal comprises three bits designated M1, M2 and M4 which are derived in the manner described below with reference to the circuit of FIG. 2.

A BCD-to-decimal converter is employed to provide the RST1 through RST7, inclusive, reset signals for the sample and hold circuits and constitutes part of the reset select circuit 45 of FIG. 1. Converter 90 may, for example, be the converter sold as part No. MC14028B by the aforementioned Motorola Semiconductor Products, Inc. The output lines Q1 through Q7 of converter 90 are maintained at a negative level unless the binary-coded-decimal (BCD) number applied to its input terminals A, B and C correspond to the number of a particular output line, in which case that output sample and hold reset line goes positive.

Referring now to FIG. 2 of the accompanying drawings, a master clock circuit includes a crystal 100 employed in conjunction with amplifier stage 101, capacitor C39 and C40, resistors R108 and R107, and buffering amplifier stages 102 and 103. In the specific embodiment described herein, by way of example, the master clock circuit generates a master clock signal at a frequency of 2.048 MHz. The master clock signal is applied to a dual binary counter 104 which counts on the leading edge of each master clock pulse to provide 256 sequential eight-bit addresses at its output terminals. Counter 104 may, for example, be a Model LS393 counter, of the type sold as SN74LS393 by Texas Instruments, Incorporated, Dallas, Tex. in which the two four-bit counter stages are cascaded to provide an eight-bit counter. The eight output address lines from counter 104 are applied to eight respective address terminals A0–A7 of an erasable programmable read-only memory (EPROM) 105 which, for example, may be of the type sold as Model 2716, 16K UV Erasable PROM by Intel Corporation of Santa Clara, Calif. The EPROM 105 is eight bits wide and is programmable with binary data such that the binary output levels appearing at output terminals Q1 through Q6 reflect the states of the addressed eight-bit (two bits not used) location as determined at address terminals A0–A7 and A8–A10. The EPROM is programmed such that, as the address count in counter 104 continuously increments, each EPROM output signal Q1–Q6 corresponds to a pulse train having a respective predetermined frequency. This frequency, in the preferred embodiment, is either 400 or 800 times the frequency of the center of the pass band of a respective filter 61–62, 63–64, etc. Thus, if the pass band of the first channel (i.e. filter 61–62) is centered at 1980 Hz (i.e. the highest tone in the R2 signalling protocol), the frequency of the signal appearing at the Q1 output terminal of EPROM 105 would be either 792 KHz or 1.584 MHz, depending upon the desired resolution. Likewise, if the sixth channel is tuned to 1380 Hz, the signal at the Q6 terminal of EPROM 105 would be at 552 KHz or 1.104 MHz, depending upon the desired resolution for that filter.

The output pulse trains from EPROM terminals Q1 through Q6 are passed through respective level shifting buffer amplifiers 111 through 116 to respective four-bit counters 121 through 126 as enable signals. These counters are all clocked by the leading edge of the master timing clock derived through a further level shifting buffer amplifier 106 from buffer 102. The clock signals CLK1 through CLK6 for the filters are derived either from the Q2 (i.e. divide by eight) or Q3 (i.e. divide by 16) output terminals of respective counters 121 through 126. Selection of the desired counter output terminal is made by strapping the respective clock signal lines (at terminals MC5, MC11, MC2, MC8, MB2 and MB5) to the desired counter output (at terminals MC6 or MC4, MC12 or MC10, MC3 or MC1, MC9 or MC7, MB1 or MB4 and MB3 or MB6). In normal system operation, the clock lines derive their signals from the Q2 (i.e. divide by eight) bit of the respective counters 121–126 so that the signals provided by the EPROM 105 are at frequencies which are 400 times the center frequencies of the respective filter pass bands. The actual clock signals CLK1 through CLK6 are then at frequencies which are 50 times the pass band center frequencies. This provides a 20 Hz resolution for selection of the desired frequency by the MF10 filters. The resolution can be improved to 10 Hz by deriving the clocks from the Q3 terminals of counters 121–126, in which case the EPROM output signals are 800 times the pass band frequencies and the tuning range of the filters is reduced by one half.

As noted above, the leading edge of the master clock pulses is used to clock counters 121–126 and counter 104. The delay through counter 104 is approximately 60 nanoseconds whereas the delay in EPROM 105 is approximately 200 nanoseconds. Thus, the EPROM output state is changed with each address change at counter 104 and the next clock pulse is employed to increment counters 121–126, or not, in accordance with whether or not that counter is enabled by the respective EPROM output signal, resulting from the previous count.

The analog-to-digital converter 41 illustrated in FIG. 1 is also illustrated in FIG. 2. This component may, by way of example, take the form of the eight-Bit Microprocessor-Compatible A/D Converter manufactured by National Semiconductor Corporation of Santa Clara, Calif. under Product No. ADC0804. The A/D converter receives the ANALOG DATA output signal from multiplexer 40 (FIG. 3) through resistor R106 at the $V_{in}(+)$ terminal which is referred to analog ground (approximately +5 volts). Protection from excessive positive voltage is provided by diode D29. The ANALOG DATA signal amplitude is converted to an eight-bit binary number which appears at the unit data output terminals D0 through D7, inclusive. This eight-bit output signal is applied to the data bus 47 for use by external equipment, such as the Z80 microprocessor employed in the aforementioned ITEC Universal E & M Trunk System No. 600884. In the ADC0804 Model A/D Converter, internal analog switches are rapidly sequenced by successive approximation logic to match the voltage difference appearing across the $V_{in}(+)$ and $V_{in}(-)$ terminals, the latter being permanently connected to a negative reference voltage in the system of the present invention. The most significant bit is tested first and then, after eight comparisons (64 clock cycles), an eight-bit number is available to the output terminals and the $\overline{INT}$ (interrupt) output line makes a high-to-low transition. On the next high-to-low transition at the $\overline{RD}$ (read) input terminal, the binary data at the output terminals is gated onto the bus. As long as the $\overline{CS}$ terminal, which is at a negative level permanently in the present invention, and the $\overline{RD}$ terminal remain low, the A/D converter applies the output data to the bus. Conversion begins in one to eight clock periods after the $\overline{WR}$ input makes a low-to-high transition. The internal clock oscillator of the converter has a frequency determined by the resistor R105 connected between its CLK R and CLK IN terminals and the capacitor C29 connected between its CLK IN terminal and a reference voltage.

The signal applied to the $\overline{WR}$ terminal is designated as the start signal and is derived from an address decoder 130. The address decoder may be a Model LS138 decoder which receives a binary address on its input lines A, B, C and GA and provides an appropriate binary coded address for use at the A/D converter 41 and latch circuit 131 and 132. Specifically, the Y0, Y1, and Y3 output bits of address decoder 130 are employed to control the writing of information into the latch circuits 131 and 132 and the starting of conversion by A/D converter 41. The Y4 and Y5 output bits from the address decoder are used to control reading of data from the A/D converter 41. The input address terminals A, B, C and GA of decoder 130 receive address and control signals designated A0, A1, $\overline{WR}$ and $\overline{SEL}$, respectively, from external system components, such as the Z80 microprocessor employed in the Product No. 600884. As used in conjunction with address decoder 130, the $\overline{WR}$ signal applied to that decoder is high when the address represented by signals A0 and A1 is a valid read address.

Latches 131 and 132 serve to latch binary data received on data bus 47 from the external microprocessor and may each take the form of the Hex Type D Flip-Flop sold under Product No. MC14174 by the aforementioned Motorola Semiconductor Products, Inc. These latches each include six D-type flip-flops which are commonly clocked at the common CLK terminal, commonly reset at the common RST terminal, receive independent binary data at respective data input terminals D0 through D5 and provide data output signals at respective data output terminals Q0 through Q5. The flip-flops in latch circuit 131 provide the Q0, Q1 and Q2 signals through respective level shifting buffer amplifiers 133, 134 and 135 as the M1, M2 and M4 signals used to address multiplexer 40 as illustrated in FIG. 3. The Q3, Q4 and Q5 output signals from latch circuit 130 are applied as the RS1, RS2 and RS4 signals, respectively, to the BCD-to-decimal converter 90 of FIG. 3 in order to effect selective reset of the various sample and hold circuits described in relation to FIG. 3.

The Q0, Q1 and Q2 output signals from latch 132 are applied to EPROM 105 to select which of the EPROM channels is in use. These address bits can thereby change the clock frequency provided at any EPROM output terminal and permit different signalling protocols, such as R1 or R2, to be quickly selected. The Q3 output line from latch circuit 132 is reserved for future use to permit expansion of EPROM 105 to a sixteen-channel device. In the present embodiment, the Q3 signal remains unused at strap terminal MA3 and a positive voltage is applied to the $V_{pp}$ terminal of EPROM 105 via strap terminals MA2 and MA4; however, the MA3 and MA4 terminals may be strapped together for a sixteen-channel embodiment. The Q4 output terminal of latch 132 provides the P signal applied, through level shifting buffer amplifier 137, to the various filter stages 61, 63, etc. in order to power up (enable) the filters when needed. More specifically, the binary level of the P signal applied to each MF10 unit determines whether the filters are in the low power (disabled) state, or enabled with the filter pass band 1/50th of the applied clock frequency. Finally, the Q5 output terminal of latch circuit 132 applies the HI Q signal, via buffer amplifier 136, to the quality factor control terminal of each multiplexer 65, 67, etc. to select the resistances which determine the Q of the filter stages. The Q4 output terminal of latch 132 is also applied, via an inverting buffer amplifier 138, to the $\overline{CE}$ input terminal of EPROM 105, thus placing the EPROM in a low power state simultaneously with the MF10 filters being in such a state.

Other components illustrated in FIG. 2 but not previously described include capacitor C30 which capacitively couples each of the DGND, AGND and $V_{in}(-)$ terminals of A/D converter 41 to analog ground, these terminals also being connected directly to a negative reference voltage. The $\overline{INT}$ output terminal of A/D converter 41 is coupled through a tristate buffer 139 to the D0 data line of bi-directional data bus 47. At decoder 104, a capacitor C31 is connected between the $V_{cc}$ and GND terminals which are also connected to positive and negative reference voltages, respectively. Capacitors C27 and C28 are connected to $V_{dd}$ and $V_{ss}$ terminals of latches 131 and 132, respectively, their terminals also being connected to respective positive and negative reference voltages.

The receiver is externally controllable by means of signals A0, A1, $\overline{WR}$ and $\overline{SEL}$ applied to address decoder 130 for determining whether the bi-directional data bus is employed to transmit data from A/D converter 41 to the external equipment or to transmit data from the external equipment to the latches 131 and 132. The A0 and A1 serve to select between latches 132 and 133. Specifically, the $\overline{WR}$ signal goes low to permit the A0 and A1 signals to provide the necessary clock pulses to the latches and the start signal to the A/D converter 41. The $\overline{WR}$ signal is thus used as an address bit to reduce the number of gates. The A0 and A1 signals are low order address bits. If the $\overline{WR}$ signal is low, the A0 and A1 bits specify which of the Y0 through Y3 output lines are selected. If the $\overline{WR}$ signal is high, a "read" condition exists and the address from bits Y4 through Y7 is employed. In other words, the Y0 through Y3 bits serve as a clock selected by the A0 and A1 input bits. The Y4 output signal is used to gate onto the bus an "interrupt" signal indicating that data is ready for transmission from the A/D converter 41. The data transmitted to the latches determines which sample and hold circuit is to be reset and which signal is to be passed by multiplexer 40 at any time, as well as determining which channels of the EPROM 105 are to be operated and further determining the Q and power up status of the filters. The externally supplied data which is applied to data lines D0 through D7 of bus 47, and the control signals A0, A1, $\overline{WR}$ and $\overline{SEL}$ applied to decoder 130, are readily provided by the Z80 microprocessor described hereinabove. The receiver can be operated under the control of the microprocessor to effect the different operations described. Alternatively, of course, the external data and control signals may be provided in any manner.

A typical operation of a system employing the receiver, such as the 600884 Universal E & M Trunk System operating under the control of a Z80 microprocessor and using an R2 signalling protocol, proceeds in the following manner. When the $\overline{WR}$ line applied to decoder 130 is high, and the select line is pulsed low, the addresses on the A0 and A1 lines are considered valid so that when the binary number on these lines selects the Y0 output of decoder 130, latch circuit 131 is clocked with each pulse. The data applied from the microprocessor to latch 131 on bus 47 is thereby clocked into the latch to provide the desired M1, M2 and M4 signals to pass the corresponding signals through multiplexer 40, and to provide the RS1, RS2 and RS4 signals to reset the selected previous sample and hold circuits simultaneously. Typically, the microprocessor waits, after all the sample and hold circuits are reset, approximately 1.1 periods of the highest receiver signal tone frequency and then connects the corresponding highest frequency channel sample and hold circuit output signal through the multiplexer 40. The assumption is made that by the time the multiplexer passes the sample and hold signal from the highest frequency channel and the A/D converter has converted it to binary data which is applied to the bus, 1.1 periods of the next highest frequency received signal has elapsed so that the multiplexer can be immediately addressed to pass the signal from that sample and hold circuit. The 1.1 period corresponds to the time required to be sure that a previously reset sample and hold circuit has the desired sampled peak level stored in its capacitor. Since the lowest frequency signal requires the longest settling time after reset, the sampled and held signals are passed in descending order of channel frequency.

The multiplexer is then successively addressed until all six filter channels and the seventh unfiltered channel are passed to the A/D converter which provides a binary representation of each passed signal to the microprocessor via bus 47. The microprocessor is able to compile a table of the six sampled tone levels and pick the two highest levels of the six (if dual tone signalling is employed as is the case in the R1 and R2 signal protocols). If the two highest received tone levels are also sufficiently high to meet or exceed a pre-established threshold, and if the other four received tone levels are below another pre-established threshold, the system provides an output indication that a tone pair has been received. If, after the six channels have been sampled and the sampled levels have been processed, a valid tone pair is not established, the sampling and processing is repeated until the valid tone pair is received.

The seventh channel, which is the unfiltered wide band audio signal channel, may be used as part of the validating process of the two received tones. For example, the level of the sampled wide band signal should be approximately equal to the sum of the two received tones. The tone receiver of the present invention is inexpensive because it can be adjusted in frequency and Q by software control and, therefore, requires much less expensive hardware than prior art tone receivers. Thus, the same receiver can be adjusted to receive either the backward-transmitted or forward-transmitted tones in the R2 signalling protocol under software control; or it can be similarly adjusted for use with the R1 signalling protocol.

It will be understood that the receiver of the present invention does not require the use of an EPROM for clock signalling generation. Rather, any source of plural clock signals of variable frequency may be employed. Further, although four-pole filtering is employed in each channel, this should be viewed as a desirable but not as a crucial feature of the present invention. Specifically, the rectifier-sample and hold combination permits a settling time of just one cycle of the channel tone frequency so that only the filter settling time presents a potential for delay. The four-pole filtering reduces this problem by using a lower Q and more poles to accomplish adjacent channel separation. In any case, the ability to select the filter channel Q factor permits adjustment of on-off recognition time for each signalling application. Additional poles of filtering can be used to eliminate the variable Q requirement.

Other variations of the specific components are also possible. For example, the A/D converter, instead of having a linear output versus input characteristic, could have a logarithmic characteristic in order to expand resolution at higher signal levels.

By way of example only, the following table is provided with a list of the values of components employed in the specific system illustrated in FIGS. 2 and 3. It must be stressed that these component values are provided only by example in order that a complete working embodiment of the tone receiver may be presented. Variations from these components may be employed depending upon the nature of the application to which the tone receiver is to be put.

TABLE I

| Component Number | Component Value |
| --- | --- |
| R15, R16, R49, R50, R19, R20, R54, R53 | 100K ohms |
| R17, Rwl | 11.0K ohms |
| R18, R22 | 4.22K ohms |
| R23, R24, R57, R58, R39, R42, R25, R40, R59 | 21.5K ohms |
| R26, R41, R60, R36, R105 | 10K ohms |
| R27, R43, R61 | 75K ohms |
| R28, R48, R62 | 100K ohms |
| R29, R33, R38 | 6.8K ohms |
| R30, R32, R45 | 45.3K ohms |
| R31 | 24K ohms |
| R34 | 3.01K ohms |
| R35, R106, R107 | 1K ohm |
| R37, R44, R47 | 499K ohms |
| R46 | 50K ohms |
| R51, R55 | 5.11K ohms |
| R52, R56 | 2.94K ohms |
| R108 | 1 M ohm |
| C5, C16, C9 | 10 $\mu f$ |
| C6, C17, C10, C11, C12 | 0.01 $\mu f$ |
| C7 | 680 $\mu f$ |
| C8 | 0.001 $\mu f$ |
| C15, C41, C4, C27, C28, C31, C35 | 0.1 $\mu f$ |
| C29 | 150 pf |
| C30 | 3.3 pf |
| C39, C40 | 33 pf |
| All diodes except D29 | IN914A |
| D29 | IN6263 |
| Amplifiers 71, 73, 81, 82, 74, 76, 83, 84, 77, 79, 85, 86, 51, 53, 55 | 324A |
| Amplifiers 101, 102, 103, 138 | 74PC04 |
| Amplifiers 106, 111–116, 133–137 | 4504 |
| Amplifier 139 | 4503 |

While I have described and illustrated a specific embodiment of my invention, it will be clear that variations from the details of construction which are specifically illustrated and described may be resorted to without departing from the true spirit and scope of the invention as defined in the appended claims.

What is claimed is:

1. A universal signalling tone receiver for separating signal tones from a wide band audio signal, said receiver comprising:
   clock generator means for providing a plurality of clock signals having selectively adjustable frequencies;
   a plurality of switched component filter means, one for each of said clock signals, each receiving said wide band audio signal and a respective clock signal and passing only components of said wide band audio signal which reside in a narrow pass band centered about a sub-multiple of the frequency of the received clock signal;
   a plurality of rectifier means, one for each filter means, each for rectifying signal components passed by a respective filter means; and
   a plurality of resettable sample and hold circuits, one for each rectifier means, each for sampling and storing, until reset, rectified signal components from a respective rectifier means.

2. The receiver according to claim 1 further comprising:
   multiplexer means, connected to simultaneously receive the stored sampled signals from all of said sample and hold circuits, for selectively passing individual stored sampled signals connected thereto; and
   analog-to-digital converter means, connected to receive signals passed by said multiplexer means, for providing a digital signal representing the analog amplitude of signal received from said multiplexer means.

3. The receiver according to claims 1 or 2 wherein said clock generator means comprises:
   an erasable programmable memory having a plurality of output terminals, one terminal for each of said clock signals, and a plurality of address terminals for receiving plural-bit binary address numbers which determine the binary states of signals appearing at each output terminal;
   oscillator means for generating a master timing signal in the form of a high frequency pulse train; and
   counter means responsive to said master timing signal for providing said plural-bit binary address number representing a count of pulses in said master timing signal.

4. The receiver according to claims 1 or 2 wherein each filter means includes means for selectively adjusting the Q of the filter means by changing the value of a filter means parameter.

5. The receiver according to claim 4 wherein said switched component of said filter means is a capacitor and wherein said parameter is a resistor.

6. The receiver according to claim 1 wherein each sample and hold circuit comprises:
   first and second operational amplifiers, each having an inverting input terminal, a non-inverting input terminal, and an output terminal, the non-inverting input terminal of said first operational amplifier being connected to receive rectified signal components from a respective rectifier means, and wherein said inverting input terminals of said first and second amplifiers are connected to one another and to a common junction;
   a first diode connected to conduct current from the output terminal of said second operational amplifier to said common junction;
   a second diode connected to conduct current from said common junction to the output terminal of said first operational amplifier; and
   a capacitor connected between said common junction and a reference voltage level;
   wherein said non-inverting input terminal of said second operational amplifier is a reset terminal responsive to a reset pulse applied thereto for discharging said capacitor through said common junction.

7. The receiver according to claims 1 or 6 wherein each rectifier means comprises:
   one operational amplifier having an inverting input terminal connected to receive said signal components passed by a respective filter means, a non-inverting input terminal connected to a reference voltage, and an output terminal;
   one diode connected to conduct current from said inverting input terminal to said output terminal of said one amplifier;
   a further diode connected to conduct current from said output terminal of said one amplifier to a first circuit point;

a first resistor path connected between said first circuit point and the inverting input terminal of said one amplifier;

a further operational amplifier having an output terminal, a non-inverting input terminal connected to reference voltage, and an inverting input terminal;

a second resistor path connected between said first circuit point and the inverting input terminal of said further amplifier; and a third resistor path connected between the output and inverting input terminals of said further amplifier;

wherein said rectified signal components appear at the output terminal of said further amplifier.

8. The receiver according to claim 2 further comprising:

additional rectifier means for rectifying said wide band audio signal; and an additional sample and hold circuit for sampling and storing, until reset, rectified signals from said additional rectifier means;

wherein the sampled and stored signal from said additional sample and hold circuit is connected to said multiplexer means and is selectively passed therethrough to said analog-to-digital converter means.

9. A method for separating signal tones from a wide band audio signal, said method comprising the steps of:

providing a plurality of clock signals having selectively adjustable frequencies;

passing through a plurality of switched component filters, one for each of said clock signals, only components of said wide band audio signal which reside in a narrow pass band centered about a sub-multiple of the frequency of a respective clock signal;

separately rectifying signals passed by each filter; and sampling and storing each rectified signal.

10. The method according to claim 9 further comprising the steps of:

selectively passing individual stored sampled signals; and providing a digital signal representing the analog amplitude of the selectively passed stored sampled signals.

11. The method according to claims 9 or 10 wherein said clock signals are provided from an erasable programmable memory which is addressable to determine the binary states of signals appearing at its data output terminals, said method further comprising the steps of:

generating a master timing signal in the form of a high frequency pulse train; and providing a plural bit binary address number for said memory in the form of a count of pulses in said master timing signal.

12. A receiver for use in separating n of m possible tones from a composite wide band signal, wherein n and m are integers and m is greater than 1, said receiver comprising:

means for providing at least m individual clock signals, each having a selectively adjustable frequency;

a plurality of at least m switched component filter means, each for receiving a respective clock signal and said wide band signal and passing only components of said wide band signal having frequencies in a narrow pass band centered about a frequency which is a sub-multiple of the received clock signal;

m full wave rectifiers, each for rectifying signal passed by a respective filter means;

m sample and hold circuit means for sampling and storing respective rectified and filtered signals; and multiplexer means for selectively passing signals, one at a time, from said m sample and hold circuit means.

* * * * *